United States Patent
Godel et al.

(10) Patent No.: US 9,021,854 B2
(45) Date of Patent: May 5, 2015

(54) METHOD AND A DEVICE FOR REAL TIME MONITORING OF A SYSTEM FOR MEASURING A FUEL FLOW RATE

(75) Inventors: Franck Godel, Chartrettes (FR); Nicolas Marie Pierre Gueit, Paris (FR); Julien Marcel Roger Maille, Saint Cheron (FR); Benoit Pontallier, Paris (FR)

(73) Assignee: SNECMA, Paris (FR)

( * ) Notice: Subject to any disclaimer, the term of this patent is extended or adjusted under 35 U.S.C. 154(b) by 563 days.

(21) Appl. No.: 13/511,816

(22) PCT Filed: Nov. 26, 2010

(86) PCT No.: PCT/FR2010/052544
§ 371 (c)(1),
(2), (4) Date: Jul. 20, 2012

(87) PCT Pub. No.: WO2011/064509
PCT Pub. Date: Jun. 3, 2011

(65) Prior Publication Data
US 2012/0272710 A1   Nov. 1, 2012

(30) Foreign Application Priority Data

Nov. 27, 2009   (FR) ..................... 09 58429

(51) Int. Cl.
*G01F 25/00*   (2006.01)
*F02C 9/28*    (2006.01)
*G01F 1/82*    (2006.01)
*F02D 41/22*   (2006.01)

(52) U.S. Cl.
CPC .............. *G01F 25/0007* (2013.01); *F02C 9/28* (2013.01); *F02D 41/222* (2013.01); *F02D 2200/0614* (2013.01); *G01F 1/82* (2013.01)

(58) Field of Classification Search
None
See application file for complete search history.

(56) References Cited

U.S. PATENT DOCUMENTS

| | | | |
|---|---|---|---|
| 5,279,107 A | 1/1994 | Meisner et al. | |
| 2004/0007081 A1 | 1/2004 | Burton et al. | |

FOREIGN PATENT DOCUMENTS

| | | |
|---|---|---|
| GB | 2 390 691 | 1/2004 |
| JP | 410019252 | * 1/1998 |

OTHER PUBLICATIONS

International Search Report Issued Feb. 21, 2011 in PCT/FR10/52544 Filed Nov. 26, 2010.

* cited by examiner

*Primary Examiner* — Robert R Raevis
(74) *Attorney, Agent, or Firm* — Oblon, McClelland, Maier & Neustadt, L.L.P.

(57) ABSTRACT

A device and method of monitoring the measurement of a fuel flow rate fed to an airplane engine includes delivering the measurement from a mass flowmeter. The monitoring also includes evaluating whether at least the following conditions are satisfied: a signal delivered by the flowmeter is less than a given value; and the engine is running on its own. The measurement is invalidated if these conditions are satisfied simultaneously.

8 Claims, 1 Drawing Sheet

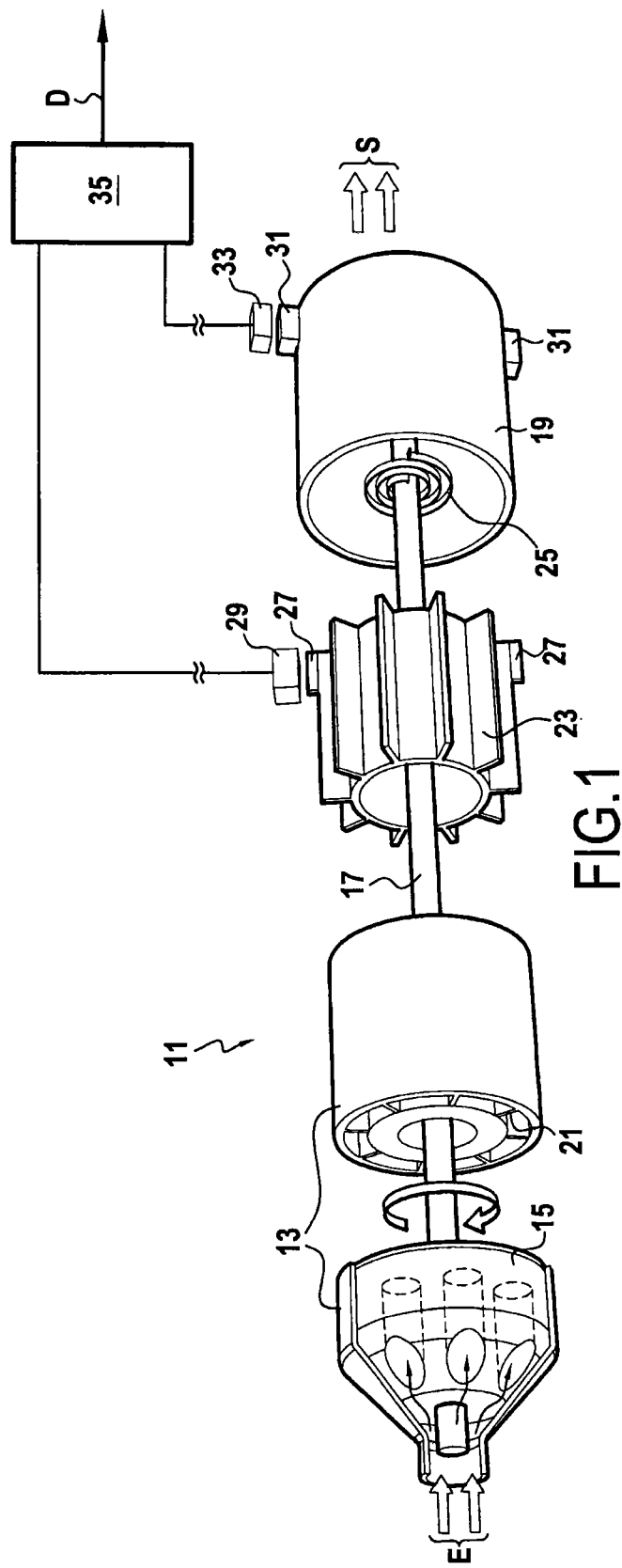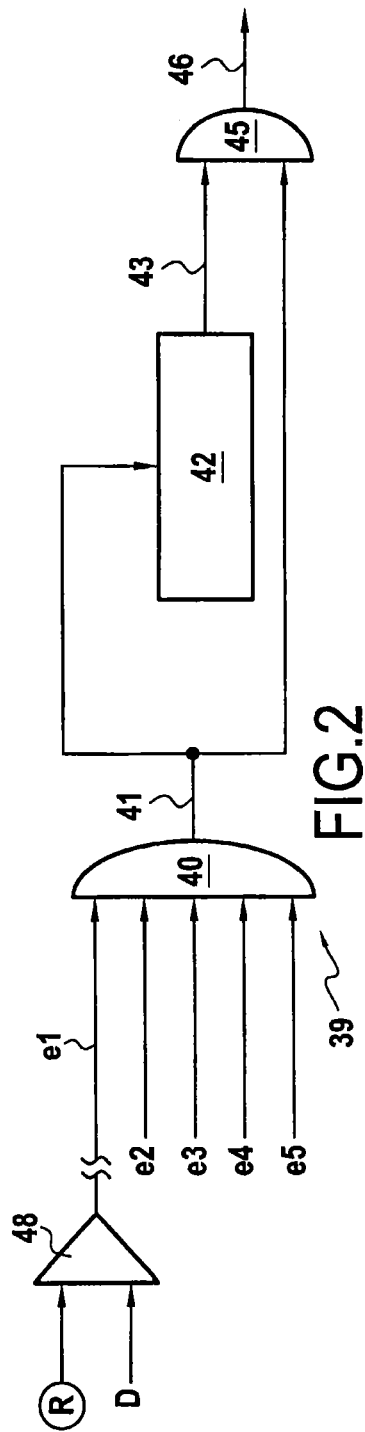

METHOD AND A DEVICE FOR REAL TIME MONITORING OF A SYSTEM FOR MEASURING A FUEL FLOW RATE

The invention relates to a method for real time monitoring of a fuel flow rate measuring system for an airplane engine fitted with a mass flowmeter of the inductive type that is known per se. A main object of the invention is to enable the on-board computer to distinguish between valid information indicating a flow rate that is zero or small, and similar information that is erroneous, resulting from some other cause such as a failure of the sensor or a maintenance error.

On numerous airplanes, a flowmeter of the mass flowmeter type is used that repetitively delivers pulses in pairs. The time difference between the two pulses of a pair is representative of the flow rate of the liquid passing through the flowmeter. This time difference measurement is sent to a computer that uses it for various operations, such as regulation, fault management, or determining the fuel consumption of the engine.

When the flow rate is zero, the flowmeter does not generate any signal.

However, it is known that when operating under icing conditions, a flowmeter of that type can be greatly disturbed. It is also possible that human error has occurred during a maintenance operation (e.g. such as a harness connector left unconnected), thereby giving rise to a lack of output signal from the flowmeter.

An object of the invention is to remove such ambiguities and, where appropriate, to generate a signal that invalidates the zero flow rate measurement delivered by the flowmeter.

More precisely, the invention provides a method of real time monitoring of a fuel flow rate measuring system for an airplane engine fitted with a mass flowmeter of the inductive type that is known per se, the method being characterized in that it consists in evaluating continuously whether at least the following conditions are satisfied:
  the signal delivered by said flowmeter is less than a predetermined threshold value;
  the engine is running on its own at a speed greater than a predetermined value; and
  in invalidating the measurement delivered by said flowmeter if said conditions are satisfied simultaneously.

Thus, the on-board computer is capable of determining whether a signal delivered by the flowmeter and indicating a flow rate that is zero or small is credible, given the operating conditions of the engine.

Among the conditions that are evaluated continuously, it is also possible to add the fact that the fuel cutoff valve is indeed open.

All of the information representing the above-mentioned conditions is conventionally available on an airplane, such that it suffices to collect this information and make the appropriate comparisons in order to implement the method of the invention.

Nevertheless, and preferably, all of the conditions must be satisfied for a duration that is sufficient to provide protection against the natural inertia of the flowmeter in the event of the fuel cutoff valve being closed and then immediately reopened. Such an operation is sometimes performed deliberately by the pilot. For this purpose, the flow rate measurement is invalidated only if said conditions are satisfied simultaneously for a predetermined time interval. The time interval depends on the specific characteristic of the flowmeter, and more particularly on its time constant, which may in particular be of the order of 5 seconds (s).

The invention also provides a monitoring installation for monitoring a fuel flow rate measuring system for an airplane engine fitted with a mass flowmeter of the inductive type that is known per se, the installation being characterized in that it comprises a combinatorial logic circuit of the additive type comprising at least:
  an input connected to comparator means receiving the signal from said flowmeter and comparing it with a predetermined threshold value;
  an input receiving a signal representative of the speed of the engine running on its own; and
  in that the output from said combinatorial logic circuit is connected to means for at least signaling a failure of the flowmeter.

The term "combinatorial logic circuit of the additive type" is used, for example, to cover a circuit having an AND function or a NAND function and receiving the above information or its equivalent.

Advantageously, the combinatorial logic circuit includes at least one additional input receiving a signal representative of the fact that a fuel cutoff valve is open.

According to an advantageous characteristic, timer means are incorporated in said combinatorial logic circuit. In this way, information about the failure of the flowmeter is validated only at the end of a time interval during which all of the above-defined conditions have been satisfied.

The invention can be better understood and other advantages thereof appear more clearly in the light of the following description of an embodiment of a monitoring installation in accordance with the principle of the invention, given purely by way of example and with reference to the accompanying drawing, in which:

FIG. 1 is a diagrammatic exploded perspective view of a mass flowmeter of the inductive type, and to which the invention applies in particular; and FIG. 2 is a block diagram of a monitoring installation for monitoring a system for measuring the fuel flow rate of an airplane engine, the system including such a flowmeter.

FIG. 1 shows a mass flowmeter 11 of the inductive type to which the invention may be applied in particular. The flowmeter comprises a housing 13 forming a duct element through which fuel passes. The housing has a fluid inlet E and an opposite fluid outlet S. At its inlet end it has a small turbine spinner 15 through which the fluid passes. The spinner rotates a shaft 17 arranged axially inside the housing. The shaft 17 is also fastened to a rotary drum 19 situated close to the outlet. Downstream from the rotor 15 a ring of stationary vanes forms a flow-straightener 21 and is situated upstream from a bladed wheel 23 mounted to rotate about the shaft. The wheel is connected to the shaft 17, and thus to the drum 19, by means of a spring 25.

The bladed wheel 23 carries magnets 27 that move past a first coil 29. The drum 19 carries magnets 31 that move past a second coil 33. It is known that the pulses delivered by the coils have the same frequency, but that their phase offset is representative of the mass flow rate of the fluid (fuel) passing through the flowmeter. On the basis of the "pairs" of pulses delivered by the two coils, it is possible to generate a succession of steep-sided pulses (e.g. by means of a bistable counter 35). The duration of such a pulse is representative of the phase offset and thus of the flow rate. This information D is acquired by an on-board computer (not shown); it is used, for example, for the purpose of informing the pilot about the fuel consumption of the airplane engine.

If the flow rate information D initiates a flow rate that is zero or nearly zero, it is desirable for the on-board computer to remove ambiguity amongst several possibilities, i.e. a rate that is indeed zero or an erroneous measurement from the flowmeter as a result of a failure thereof, e.g. because of ice or indeed for some other reason such as a maintenance error (wrongly connected harness, for example).

This problem is solved by the monitoring installation of FIG. 2 that implements the above-defined method.

The monitoring installation comprises a combinatorial logic circuit 39 of the additive type comprising mainly a gate 40 of the AND type having a plurality of inputs and an output 41 connected to timer means 42. The output 43 from the timer means and the output from the AND gate 40 are connected to two inputs of an AND gate 45. The output 46 from the AND gate 45 delivers a signal suitable for distinguishing between flow rate information given by the flowmeter that should be validated or invalidated.

More particularly, the AND gate 40 has an input e1 connected to the output of a comparator 48. This comparator receives firstly the signal D delivered by the bistable counter 35 of FIG. 1 and secondly a reference value R representative of a minimum flow rate threshold. The minimum flow rate may for example be the lock-on flow rate of the flowmeter, which is about 65 kilograms per hour (kg/h).

A second input e2 of the AND gate receives information indicating that the airplane engine is indeed running on its own at a speed faster than a predetermined value. For example, this predetermined value may be the cutoff speed of the starter. If the engine is running at a faster speed, that means that it is running on its own and no longer under drive from the starter. For example, a sensor may measure the speed of rotation of a shaft, and a comparator may compare that speed with a value representing the cutoff speed of the starter. A third input e3 of the AND gate may also receive information generated by the computer and constituting a validity status certifying that the information present on the input e2 is reliable.

A fourth input e4 of the AND gate 40 receives information that the fuel cutoff valve is indeed monitored to be in an open state.

A fifth input e5 of the AND gate 40 receives information generated by the computer and consisting in a validity status certifying that the information present on the input e4 is reliable.

If all of the information received on the various inputs of the AND gate 40 is "positive", then the following situation applies:
  the flow rate information delivered by the flowmeter is zero or almost zero;
  the engine is operating normally and on its own; and
  the fuel cutoff valve is open.

The consequence is that, a priori, the flowmeter 11 is defective or in any event the information that it is delivering is not correct. Under such conditions, the YES signal delivered at the output 41 of the AND gate 40 is applied to one of the inputs of the AND gate 45 and to the input of the timer means 42 having its output 43 connected to the other input of the AND gate 45.

The timer means may be constituted by a counter associated with a clock. If the output 41 of the AND gate 40 is YES, a counter is incremented. If the output is NO, the counter is reinitialized. If the output 41 is YES for a predetermined time interval, then the timer circuit issues a YES signal to the input of the AND gate 45. From that moment on, the flow rate information is declared to be invalid, in application of a YES signal on the output 46.

Two situations can then arise. The fault was present before the engine was started, as might be the case for example if a harness was wrongly reconnected during a maintenance operation. The fault may also appear in flight if the flowmeter is damaged or if its operation is disturbed by icing problems. The invention makes it possible to detect the two types of fault specified above.

The invention claimed is:

1. A method of real time monitoring of a fuel flow rate measuring system for an airplane engine fitted with a mass flowmeter of an inductive type, the method comprising:
  evaluating continuously whether at least the following conditions are satisfied:
    a signal delivered by said flowmeter is less than a predetermined threshold value, and
    the engine is running on its own at a speed greater than a predetermined value; and
  invalidating the measurement delivered by said flowmeter if said conditions are satisfied simultaneously.

2. The method according to claim 1, wherein the conditions that are evaluated continuously include taking account of the fact that a fuel cutoff valve is open.

3. The method according to claim 1, wherein said flow rate measurement is invalidated only if said conditions are satisfied simultaneously for a predetermined time interval that depends on the flowmeter used.

4. The method according to claim 3, wherein said time interval is of the order of 5 s.

5. A monitoring installation for monitoring a fuel flow rate measuring system for an airplane engine fitted with a mass flowmeter of an inductive type, comprising:
  a combinatorial logic circuit of the additive type comprising:
    an input connected to comparator means receiving the signal from said flowmeter and comparing it with a predetermined threshold value, and
    an input receiving a signal representative of the speed of the engine running on its own,
  wherein the output from said combinatorial logic circuit is connected to means for at least signaling a failure of the flowmeter.

6. The installation according to claim 5, wherein said combinatorial logic circuit includes at least one additional input receiving a signal representative of the fact that a fuel cutoff valve is open.

7. The installation according to claim 5, wherein timer means are incorporated in said combinatorial logic circuit to validate said failure only after a predetermined time interval during which said conditions are satisfied, the time interval depending on the flowmeter used and more precisely on its time constant.

8. The installation according to claim 5, wherein timer means are incorporated in said combinatorial logic circuit to validate said failure only after a predetermined time interval during which said conditions are satisfied, the time interval depending on a time constant of the flowmeter used.

* * * * *